United States Patent
Broughton et al.

(10) Patent No.: US 10,884,314 B2
(45) Date of Patent: Jan. 5, 2021

(54) SOLID STATE REFLECTIVE DISPLAY

(71) Applicant: Sharp Kabushiki Kaisha, Osaka (JP)

(72) Inventors: Benjamin John Broughton, Oxford (GB); Diego Gallardo, Oxford (GB); Edward David Heywood-Lonsdale, Oxford (GB); Hywel Hopkin, Vale of Glamorgan (GB)

(73) Assignee: Sharp Kabushiki Kaisha, Osaka (JP)

( * ) Notice: Subject to any disclaimer, the term of this patent is extended or adjusted under 35 U.S.C. 154(b) by 416 days.

(21) Appl. No.: 15/547,844

(22) PCT Filed: Feb. 3, 2016

(86) PCT No.: PCT/JP2016/000564
§ 371 (c)(1),
(2) Date: Aug. 1, 2017

(87) PCT Pub. No.: WO2016/125491
PCT Pub. Date: Aug. 11, 2016

(65) Prior Publication Data
US 2018/0017840 A1    Jan. 18, 2018

Related U.S. Application Data

(63) Continuation of application No. 14/614,667, filed on Feb. 5, 2015, now abandoned.

(51) Int. Cl.
*G02F 1/25* (2006.01)
*G02F 1/1335* (2006.01)
(Continued)

(52) U.S. Cl.
CPC .............. *G02F 1/25* (2013.01); *G02B 5/201* (2013.01); *G02B 26/007* (2013.01);
(Continued)

(58) Field of Classification Search
CPC ........ G02B 5/20; G02B 5/201; G02B 26/007; G02B 27/2278; G02F 1/01; G02F 1/0107;
(Continued)

(56) References Cited

U.S. PATENT DOCUMENTS

| | | | |
|---|---|---|---|
| 6,819,469 B1 * | 11/2004 | Koba | G03H 1/2294 359/290 |
| 2002/0079501 A1 * | 6/2002 | Okada | G02F 1/1362 257/88 |
| 2017/0031231 A1 * | 2/2017 | Bhaskaran | G02F 1/0147 |

FOREIGN PATENT DOCUMENTS

WO    2015/097468    7/2015

OTHER PUBLICATIONS

Hosseini, Peiman and Bhaskaran, Harish, Colour performance and stack optimisation in phase change material based nano-displays, Proc.of SPIE, Jun. 1, 2015, vol. 9520, 95200M-1-7.

(Continued)

*Primary Examiner* — Thomas K Pham
*Assistant Examiner* — Ibrahima Diedhiou
(74) *Attorney, Agent, or Firm* — Renner, Otto, Boisselle & Sklar, LLP

(57) ABSTRACT

A switchable reflective colour filter is provided for use in a display device. The switchable reflective colour filter includes a plurality of sub-pixel regions of at least two colour types, each including a layer of phase change material which is switchable between a first state and a second state, the first and second states being two solid but structurally distinct states having different optical properties. Each sub-pixel region further includes two electrode layers, a mirror layer, and a spacer layer or air gap. The phase change material layer in each sub-pixel region is positioned between the two electrode layers, and separated from the mirror layer by the spacer layer or air gap. The switchable reflective colour filter may be incorporated into a display device
(Continued)

including a pixelated switchable absorber. A luminance of coloured light reflected from any of the sub-pixel regions is controllably attenuated by the pixelated switchable absorber.

11 Claims, 12 Drawing Sheets

(51) Int. Cl.
*G02B 5/20* (2006.01)
*G02B 26/00* (2006.01)
*G02F 1/01* (2006.01)
*G02F 1/03* (2006.01)
*G02F 1/17* (2019.01)

(52) U.S. Cl.
CPC .......... *G02F 1/0147* (2013.01); *G02F 1/0311* (2013.01); *G02F 1/0322* (2013.01); *G02F 1/133514* (2013.01); *G02F 1/17* (2013.01); *G02F 2203/62* (2013.01)

(58) Field of Classification Search
CPC ................ G02F 1/0147; G02F 1/0316; G02F 1/133514; G02F 1/1343; G02F 1/17; G02F 1/19; G02F 1/23; G02F 1/25; G02F 2203/34; G02F 2203/62; G02F 2201/52; G09G 3/2003; G09G 2300/0452; H01L 45/06
USPC ........ 359/237, 238, 240, 245, 259; 349/104, 349/106, 108, 113, 114
See application file for complete search history.

(56) References Cited

OTHER PUBLICATIONS

B. Gaily et al., "5.1: Invited Paper: A 5.7" Color Mirasol XGA Display for High Performance Applications", 2011, pp. 36-37.
K. Hashimoto et al. "Reflective Color Display Using Cholesteric Liquid Crystals", 1998, pp. 239-242, 354.
P. Hosseini, "An optoelectronic Framework Enabled by Low-Dimensional Phase-Change Films", Nature 511, 206-211, Jul. 10, 2014.
E. Dorjgotov et al., "39.4: Liquid-Crystal Etalon Device for Reflective Display", SID Symposium Digest of Technical Papers vol. 39, Issue 1, pp. 568-571, May 2008.
T. Yashiro et al., "5.3: Novel Design for Color Electrochromic Display", SID Symposium Digest of Technical Papers, vol. 42, Issue 1, pp. 42-45, Jun. 2011.
A. Geisow et al. "Paper No. 3.3: Reflective Colour Displays", Journal of the Society for Information Display, vol. 6, Issue 4, 1998, SID Symposium Digest of Technical Papers vol. 44, Issue Supplement S1, pp. 12-14, Sep. 2013.
G. Duthaler et al, "53.1: Active-Matrix Color Displays Using Electrophoretic Ink and Color Filters" SID Symposium Digest of Technical Papers, vol. 33, Issue 1, pp. 1374-1377, May 2002.
S. Fujiwara et al. "A Bright 260,000-Color Reflective TFT-LCD(HR-TFT)", "Proceedings of the Fourth International Display Workshops", Nagoya 1997, (IDW '97), p. 879.
International Search Report for PCT/JP2016/000564, dated May 10, 2016.

* cited by examiner

| Pixel Area (R/G/B) | Pale state | Vivid state |
|---|---|---|
| | 0.333 / 0.333 / 0.333 | |
| Gamut Area (sRGB) | 14.4% | 55.4% |
| Average reflectivity | 0.41 | 0.34 |
| Luminance under D65 illumination (CIE1931 Y) | 0.48 | 0.29 |
| CIE 1976 L* | 74.6 | 60.7 |

(b)

| Pixel Area (R/G/B) | Pale state | Vivid state |
|---|---|---|
| | 0.39 / 0.17 / 0.44 | |
| Gamut Area (sRGB) | 14.4% | 55.4% |
| Average reflectivity | 0.44 | 0.35 |
| Luminance under D65 illumination (CIE1931 Y) | 0.475 | 0.264 |
| CIE 1976 L* | 74.5 | 58.4 |

SOLID STATE REFLECTIVE DISPLAY

TECHNICAL FIELD

The present invention relates to colour reflective display devices, and more particularly to reflective display devices with controllable colour capabilities.

BACKGROUND ART

Several types of display devices are known which are reflective, utilising ambient light or an artificial light directed at the front (viewer-side) face of the display, as their illumination source, and are capable of controllable colour. These types of display can be categorised broadly into two types: (1) those that produce a reflection of arbitrary colour by dividing the reflective area of each pixel up into typically three regions (sub-pixels) of fixed colour reflectivity (e.g. red, green and blue) and modulating the reflectivity of these fixed colour regions independently so as to produce a combined reflection which may be any additive mixture of the colours produced by each sub-pixel alone; and (2) those with colour tunable pixels in which both the reflection spectrum shape and reflectivity may be controlled.

Examples of the former include reflective liquid crystal displays (S. Fujiwara et al. "Proceedings of the Fourth International Display Workshops", Nagoya 1997, (IDW '97), p. 879), and electrophoretic displays with colour filters (G. Duthaler et al, SID Symposium Digest of Technical Papers, Volume 33, Issue 1, pages 1374-1377, May 2002). This type of area-sharing reflective display has the advantage that only a single active layer is needed to control overall reflectivity, so cost and complexity are low, but suffer from the disadvantage that as any given reflective area has limited reflectivity over at least some visible wavelengths, to provide the fixed colour, overall reflectivity is also limited, typically to about 30%.

Examples of colour tunable reflective displays include stacked reflective LCDs (Journal of the Society for Information Display, Volume 6, Issue 4, 1998, SID Symposium Digest of Technical Papers Volume 44, Issue Supplement S1, pages 12-14, September 2013), electrochromic displays (SID Symposium Digest of Technical Papers, Volume 42, Issue 1, pages 42-45, June 2011), and tunable cavity displays (SID Symposium Digest of Technical Papers Volume 39, Issue 1, pages 568-571, May 2008). These displays have the advantage that the full area of a pixel may be used to reflect the intended colour, greatly increasing brightness, but suffer from the disadvantages of cost, complexity and in some cases parallax issues due to stacking multiple layers, or strong changes with viewing angle due to cavity path-length effects.

A thermally and electrically switchable solid state reflective optical device has been described using a stack of transparent conducive layers sandwiching a phase-change material (PCM) layer, disposed on a metallic mirror (Nature 511, 206-211, 10 Jul. 2014). This device has the advantage that the colour of reflective light may be switched in a bistable manner between two states with high brightness and strongly differing appearance by controlling the crystalline structure of the PCM, and has a very thin, all solid state, device structure with few apparent viewing angle colour change effects. However, the two optical states the device may be switched between are controlled by the thickness of one or more of the layers, and are therefore fixed, and none of the optical states described in the Nature publication of this device are particularly useful for providing a reflective display device, being either of low contrast between the two states (e.g. blue to dark grey) or comprising colours not common for typical images (e.g. yellow to magenta).

CITATION LIST

Non Patent Literature

NPL 1: S. Fujiwara et al. "Proceedings of the Fourth International Display Workshops", Nagoya 1997, (IDW '97), p. 879.

NPL 2: G. Duthaler et al, SID Symposium Digest of Technical Papers, Volume 33, Issue 1, pages 1374-1377, May 2002.

NPL 3: Journal of the Society for Information Display, Volume 6, Issue 4, 1998, SID Symposium Digest of Technical Papers Volume 44, Issue Supplement S1, pages 12-14, September 2013.

NPL 4: SID Symposium Digest of Technical Papers, Volume 42, Issue 1, pages 42-45, June 2011).

NPL 5: SID Symposium Digest of Technical Papers Volume 39, Issue 1, pages 568-571, May 2008.

NPL 6: Nature 511, 206-211, 10 Jul. 2014.

SUMMARY OF INVENTION

A switchable reflective colour filter is for use in a display device. The switchable reflective colour filter includes a plurality of sub-pixel regions including sub-pixel regions of at least two colour types, each comprising a layer of phase change material which is switchable between a first state and a second state, the first and second states being two solid but structurally distinct states having different optical properties. Each sub-pixel region further includes two electrode layers, a mirror layer, and a spacer layer. The phase change material layer in each sub-pixel region is positioned between the two electrode layers, and separated from the mirror layer by the spacer layer.

A reflective display includes the switchable reflective colour filter of the present invention, and a pixelated switchable absorber or a pixelated switchable scatter. A luminance of coloured light reflected from any of the sub-pixel regions is controllably attenuated by the pixelated switchable absorber or pixelated switchable scatter.

Another reflective includes two electrode layers and a layer of phase change material between the two electrode layers, the phase change material being switchable between at least a first state and a second state, the first and second states being two solid but structurally distinct states having different optical properties; a mirror layer; and an air gap of variable thickness between the mirror layer and one of the electrode layers, wherein a thickness of the air gap is separately varied in different regions of the reflective display device to form a plurality of sub-pixel regions having different reflective properties.

Technical Problem

Conventional display systems have had difficulty achieving effective control of overall reflectivity, in a cost effective manner with low complexity. It is therefore desirable to provide a high quality reflective display which is capable of producing both bright and saturated colours, does not incorporate a multilayer stack of three or more active switching layers, and is sufficiently thin to avoid strong colour changes with viewing angle.

Solution to Problem

The present invention provides a switchable colour filter component, for use in a reflective display, in which multiple sub-pixel areas are used in each pixel region to provide composite colour by area-sharing means, but in which the colour reflected by each sub-pixel region is controllable between a high brightness, low saturation state, and a high saturation, lower brightness state. This control may be applied on a pixel-by-pixel basis allowing the display to show high brightness, pale colours and vivid colours simultaneously.

This function is achieved by using as the lower substrate (furthest from the viewer and ambient illumination) of the display a mirror, onto which is disposed a stack of at least one transparent conductive layer, at least one phase change material (PCM) layer, and at least one insulating spacer layer, the thickness of one or more of these layers being different in the different sub-pixel regions so as to control the colour of the reflected light from these regions independently in both of the two crystalline structure states of the PCM layer. The PCM layer may be switched between its two states by the application of electrical control signals to the conductive layers either side of the PCM layer in each sub-pixel. A second active layer is then disposed on the solid state stack of the lower substrate to provide the function of a light-valve. In this way, the first active layer (PCM) may be switched to control the colour of light reflected from each sub-pixel region, the second active layer may be switched to control the brightness (reflectivity) of each sub-pixel region, and each pixel comprises two or more sub-pixel regions to allow a range of composite colours of varying brightness, to be produced.

The present invention provides a switchable colour reflective display, in which the optical stack of the previous embodiment is modified so as to comprise an air gap as the insulating spacer layer. The thickness of the air gap may be controlled so as to enable any pixel region to display at least two distinct coloured reflection states, and both a bright and a dark achromatic reflecting state. In this way, only a single pixel type is required, so area sharing is not needed to provide full colour control, and no second active layer is required to provide the light-valve function, as each pixel may be switched between the dark and the bright and/or coloured states to provide both brightness and colour control.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

Advantageous Effects of Invention

The present invention provides a high quality reflective display which is capable of producing both bright and saturated colours, does not incorporate a multilayer stack of three or more active switching layers, and is sufficiently thin to avoid strong colour changes with viewing angle. The present invention, therefore, achieves effective control of overall reflectivity, in a cost effective manner with low complexity.

BRIEF DESCRIPTION OF DRAWINGS

In the annexed drawings, like references indicate like parts or features:

FIGS. 5(a)-5(b): are tables detailing the reflection performance of switchable colour filters of embodiments of this invention.

DESCRIPTION OF EMBODIMENTS

The present invention relates to a colour reflective display device, which has colour sub-pixels which are individually switchable between a lower brightness, higher saturation state, and a higher brightness, lower saturation state, thereby enabling the display as a whole to simultaneously display high brightness pale colours and lower brightness colours encompassing a larger area of colour gamut.

Figure 1:
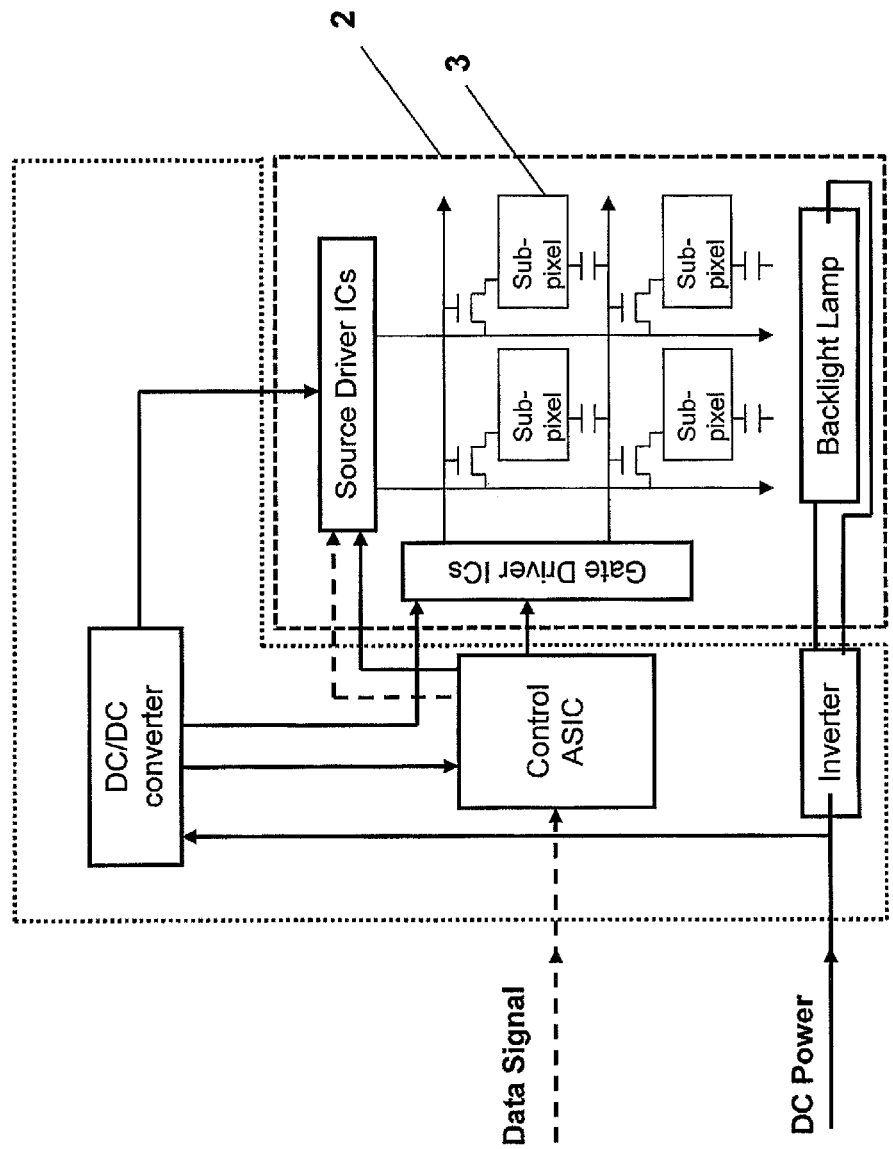
FIG. 1: is an illustration of an active matrix array, as is standard in the known art.

In a conventional configuration illustrated in FIG. 1, a switchable colour filter for a reflective display device includes a first substrate (1) onto which is disposed an active matrix array (2), of a type commonly used in flat panel displays such as liquid crystal displays (LCDs). The active matrix array defines a 2D arrangement of sub-pixel regions, each sub-pixel electrode (3) being addressable with a voltage or current independently of the other sub-pixel regions via the active matrix array and associated control electronics.

In a standard transmissive type LCD, the sub-pixel electrodes include a transparent conductor such as Indium Tin Oxide (ITO), but in the device of the present invention they include a reflective metallic material. The mirror layer of each sub-pixel region may be comprised of any reflective conductive material, for example aluminum, and may be deposited in a thick enough layer to provide a high brightness reflection over all visible wavelengths of light.

Figure 2:
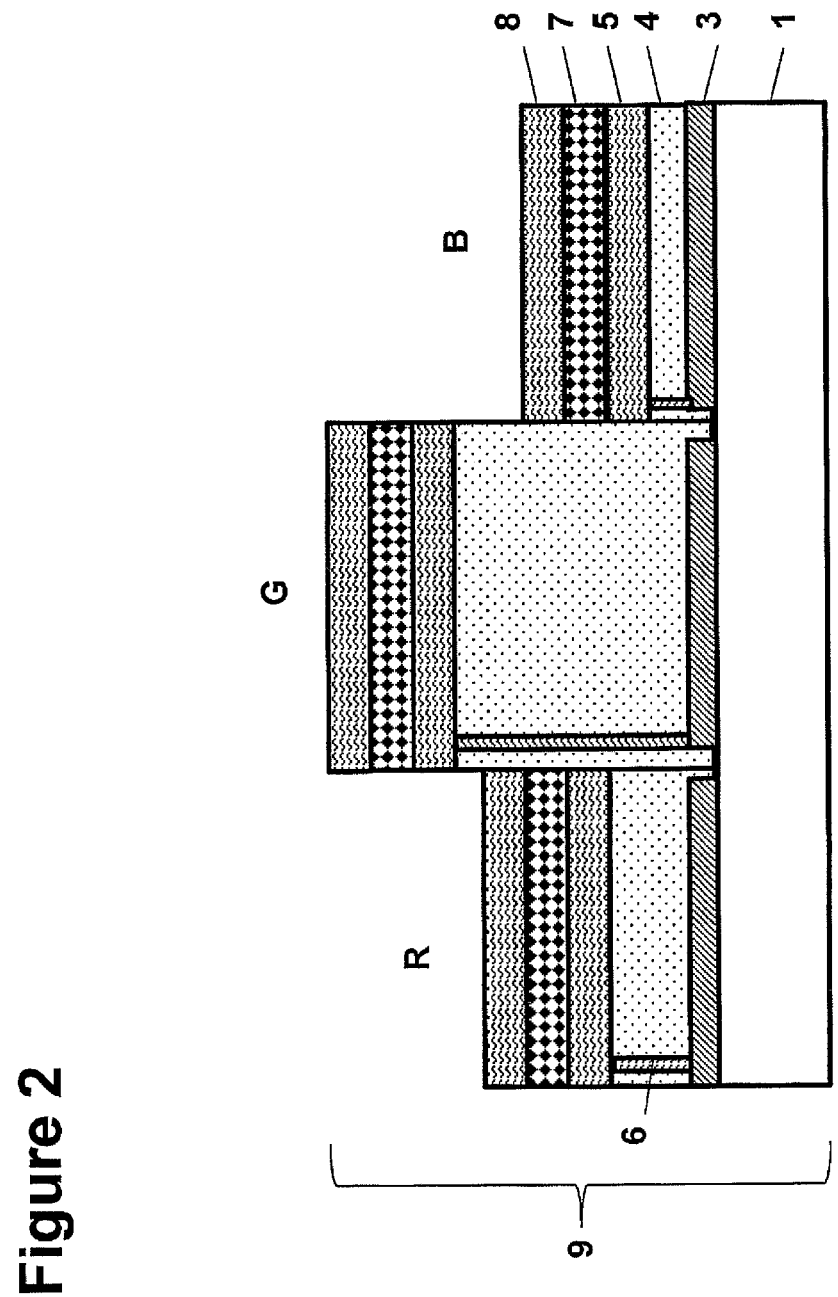
FIG. 2: is a schematic of the optical stack providing a switchable colour filter of an embodiment of this invention.

An exemplary embodiment of the invention is illustrated in FIG. 2, depicting a switchable colour filter (9) that can operate as a lower substrate of a display device. In the embodiment of FIG. 2, the switchable colour filter may be divided into three sub-pixel regions corresponding to red (R), green (G), and blue (B). The embodiment likewise includes a first substrate (1) onto which mirror sub-pixel electrodes (3) are deposited. Onto the mirror sub-pixel layer is disposed a spacer layer (4), which may be a transparent insulating layer (4) of, for example, glass (SiO2). The insulating layer is deposited in different thicknesses in the three sub-pixel regions of each pixel, being 185 nm thick in the red type sub-pixels of each pixel, 500 nm thick in the green type sub-pixels of each pixel, and 65 nm thick in the blue type sub-pixels of each pixel.

Onto the insulating layer is deposited a layer of transparent sub-pixel lower electrode (5) ITO, each sub-pixel region of which is electrically connected to its corresponding mirror sub-pixel region via a channel of conducting material (6). This may also be deposited in differing thicknesses in the three sub-pixel regions of each pixel, being 15 nm thick in the red type sub-pixels of each pixel, 30 nm thick in the green type sub-pixels of each pixel, and 50 nm thick in the blue type sub-pixels of each pixel.

Onto the transparent sub-pixel electrode is deposited a layer of the phase change material (7) (PCM), which may be germanium antimony tellurium alloy (Ge2Sb2Te5). This may also deposited in differing thicknesses in the three sub-pixel regions of each pixel, being 14 nm thick in the red type sub-pixels of each pixel, 11 nm thick in the green type sub-pixels of each pixel, and 7 nm thick in the blue type sub-pixels of each pixel.

Onto the PCM layer is deposited a second layer of transparent counter electrode (8) ITO, which may also be deposited in differing thicknesses in the three sub-pixel regions of each pixel, being 22 nm thick in the red type sub-pixels of each pixel, 30 nm thick in the green type sub-pixels of each pixel, and 14 nm thick in the blue type sub-pixels of each pixel, and which may act as a common electrode.

This optical stack, being all solid state, may form the lower substrate (9) of a display device, and provides the function of a switchable colour filter for the device, with each sub-pixel region reflecting a high brightness pale colour (one of red, green and blue) with the GST in one of its two available crystalline states (crystalline or amorphous), and a lower brightness, more saturated (vivid) equivalent of the same colour with the GST in the other state. The GST layer in each sub-pixel region of the display may be independently switched by the application of electrical control signals to the mirrored pixel electrode of the given sub-pixel region, and the uniform common electrode formed by the ITO top layer (8).

Figure 3:
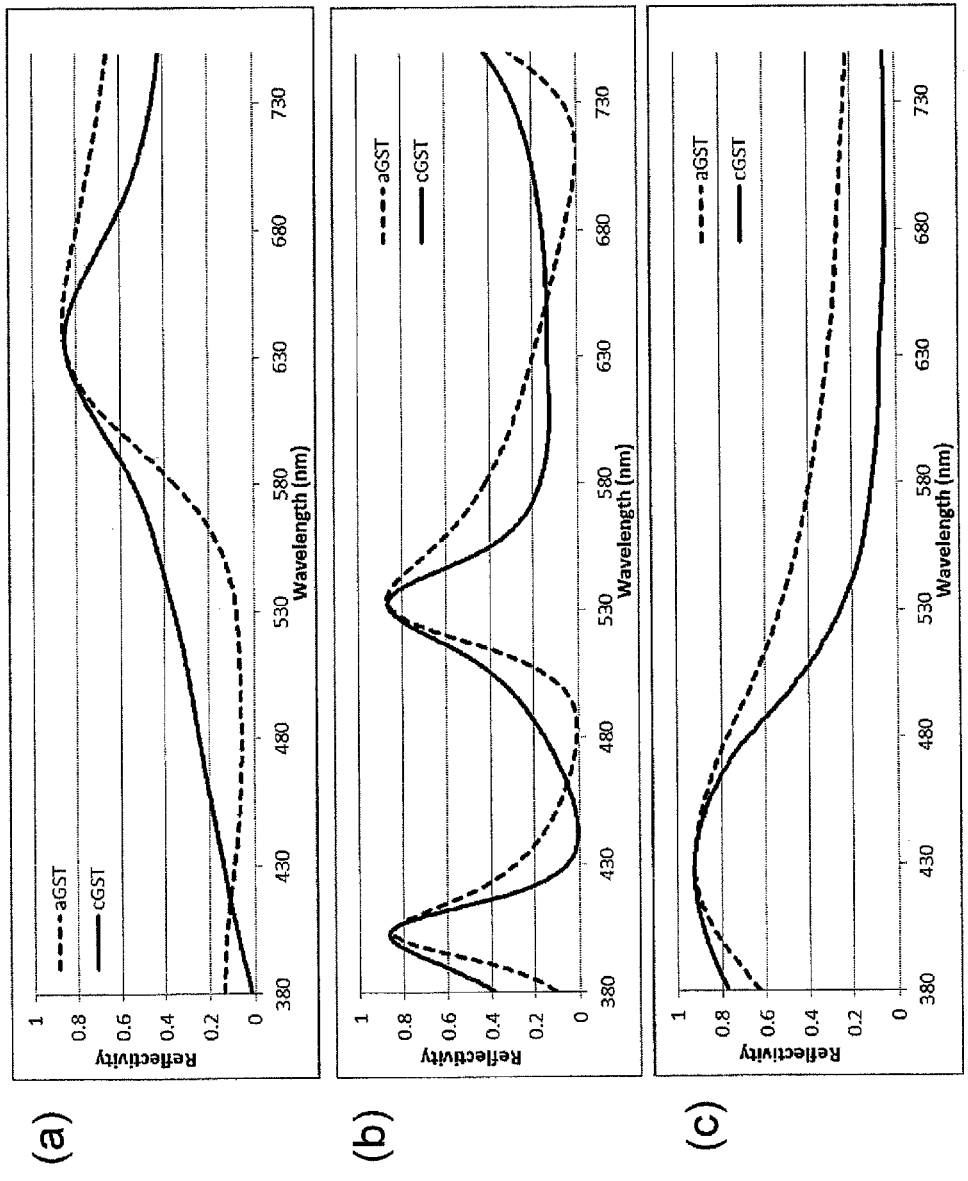
FIGS. 3(a)-3(c): are graphs showing the reflection spectra of three sub-pixel regions of the two states between which a switchable colour filter may be switched in an embodiment of this invention.
Figure 4:
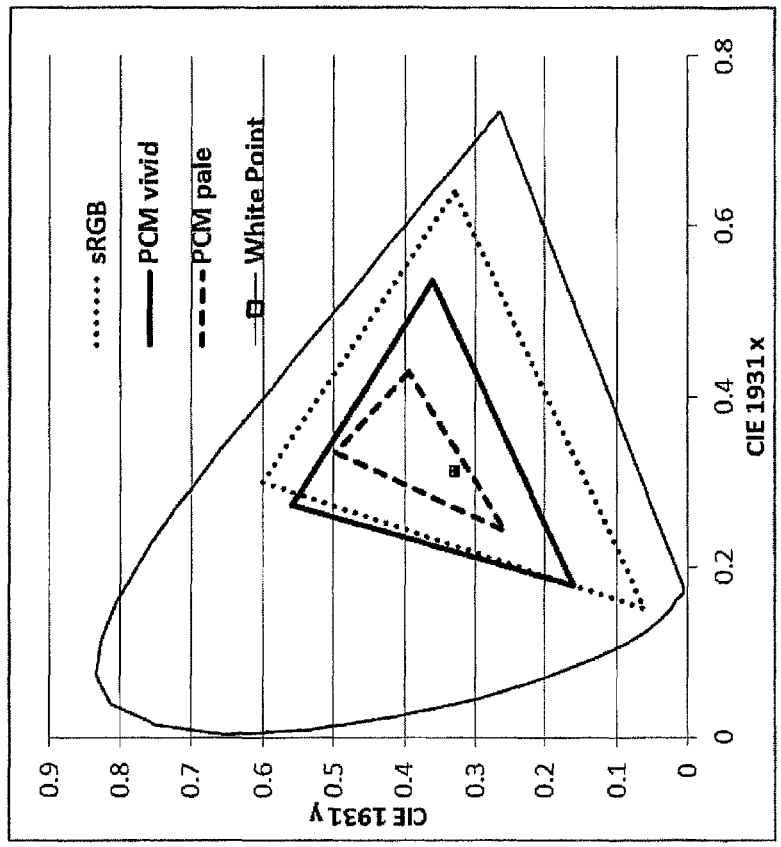
FIG. 4: is a graph showing the resulting gamut areas, and white point of the reflected colour of the two states of the switchable colour filter of an embodiment of this invention, under D65 illumination, in the CIE 1931 colour diagram.

The reflection spectra of this embodiment, with the GST PCM layer in the amorphous (aGST) and crystalline (cGST) state, are shown in FIG. 3 for the red (a), green (b) and blue (c) sub-pixel regions. It can be seen that each region is switchable between a narrower band reflection peak, providing a more saturated coloured reflection from white ambient light, to a broader band, less saturated but brighter reflection condition. FIG. 4 shows the positions in CIE1931 xy colour space that result from reflection of D65 ambient light from each of these sub-pixels in the two states, and therefore the colour gamut area achievable by a display using the device of the described embodiment as a reflective colour filter. The table in FIG. 5(a) details the maximum brightness of light reflected by the red, green and blue sub-pixel regions of the colour filter combined, in both the wide gamut and high brightness configurations. It may be particularly desirable for the colour of the reflected light from all regions of the filter to be combined to produce a particular white point under a given illumination spectrum, particularly in the high brightness state. In order for this to be achieved, the relative areas of the R, G and B sub-pixel regions in each pixel may be adjusted. FIG. 5(b) details the relative pixel area occupied by each sub-pixel region with the device of the described embodiment adjusted to reflect white light at the D65 position when under D65 illumination, and the resultant gamut areas and brightness in the two conditions.

By way of comparison, a reflective display technology with large market share is the electrophoretic E-ink technology. Current E-ink based displays have a gamut area which is 18% of the SRGB standard gamut, and brightness in the white state of L*=70 in the CIELAB space, so it is envisaged that the reflective colour filter of this invention will enable colour reflective displays which have both high gamut area and higher brightness than the current standard.

Figure 6:
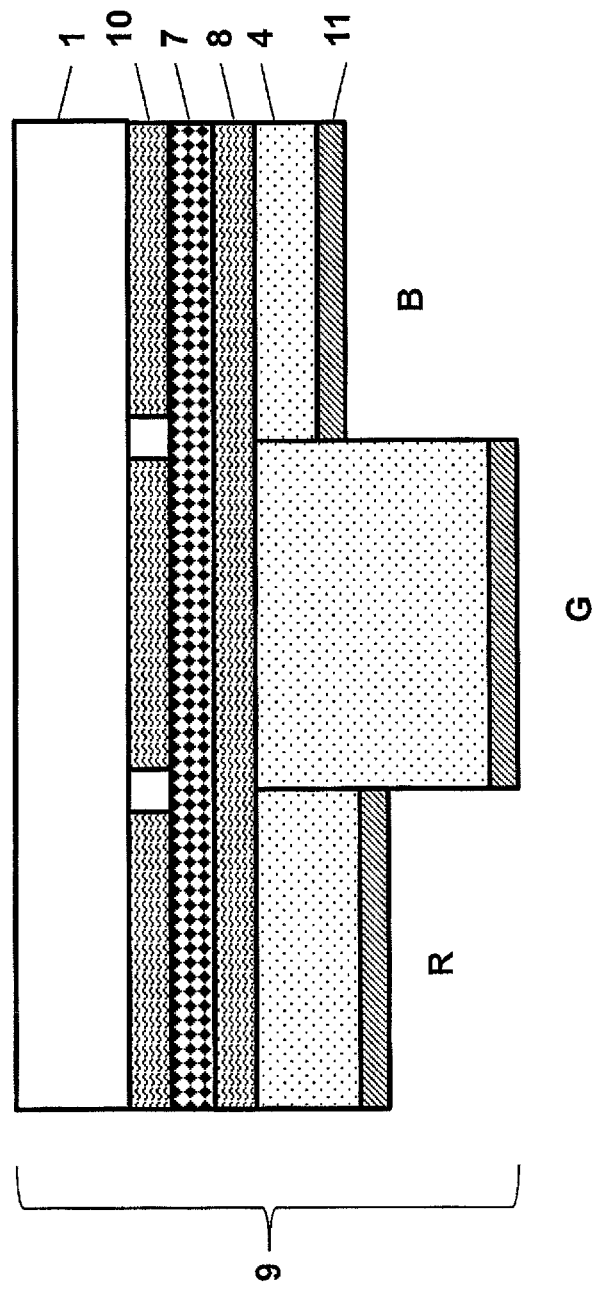
FIG. 6: is a schematic of the optical stack providing a switchable colour filter of an embodiment of this invention.

In another exemplary embodiment depicted in FIG. 6, the layers making up the optical stack of the switchable colour filter (9) may be deposited in the reverse order. In this embodiment, the active matrix array is disposed on the underside of the device substrate (1) (distal from the viewing direction), and transparent sub-pixel electrode regions (10) of e.g. ITO are provided. Onto the transparent pixel electrode/active matrix layer is deposited the PCM layer (7). Onto the PCM layer is deposited a uniform transparent counter electrode layer of e.g. ITO (8). Onto the transparent counter electrode layer is deposited the transparent, insulating, spacer layer of e.g. glass (4), and the mirror layer (11), which in this case now has no electrode function, is deposited on the insulting spacer layer.

Figure 7:
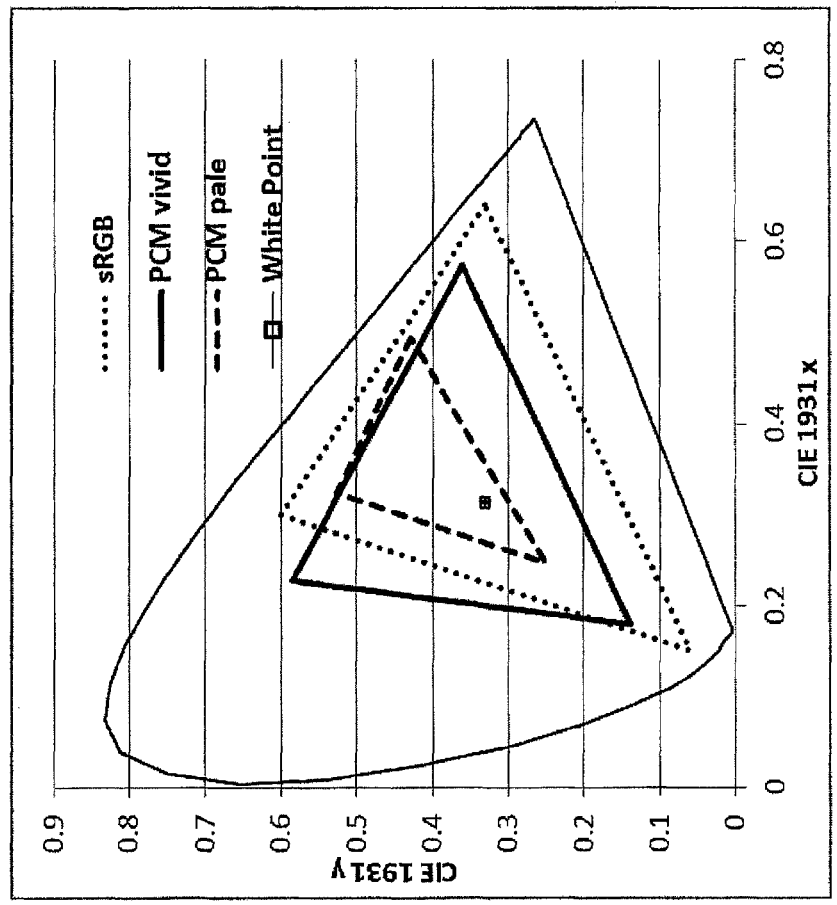
FIG. 7: is a graph showing the resulting gamut areas, and white point of the reflected colour of the two states of the switchable colour filter of an embodiment of this invention, under D65 illumination, in the CIE 1931 colour diagram.

Again, the various layers may have the differing thicknesses in the different sub-pixel regions red (R), green (G), and blue (B), comparably as described in the previous embodiment. While being optically identical to the arrangement of the previous embodiment, the embodiment of FIG. 6 has the potential advantages that no conducting vias (6) are needed to connect the sub-pixel electrodes of the active matrix to the transparent electrode layer next to the active PCM layer, and that the insulating spacer layer, having the largest thickness variation of the layers, is deposited last, which may enable the other layers to be deposited more simply. In fact, in a further variation of this embodiment, the thickness of the two ITO and the GST layer may be fixed at a uniform value across the 3 sub-pixel types, and only the thickness of the insulating spacer layer may be varied across the display area. This may considerably simplify fabrication of the device with minimal impact on the optical performance. The colour gamut area on CIE 1931 xy diagram predicted by simulation for the a device as described with uniform thicknesses of the top ITO (10), bottom ITO (8) and GST (7) layers across all three pixel regions, the layers having thickness values of 15 nm, 10 nm and 7 nm respectively, are illustrated in FIG. 7. Such a device is predicted to exhibit a gamut area of 74% of sRGB and a Lightness (CIE 1976 L*) of 68.

In further variations on these previously described embodiments, the mirror may be non-metallic, with a transparent electrode on top, in order to separate the optical and electrical functions provided by this element. This may allow a dielectric mirror to be used, with a particular wavelength reflection characteristic, which may be made differently in each of the sub-pixel types, which may be advantageous. The mirror may also be non-specular reflecting, for example a high brightness white ink or lambertian reflector layer may be used, or may be retro-reflecting. Additionally, the number of alternating PCM and ITO or equivalent transparent conductor layers may be increased, to further control the reflection spectra produced in the available combinations of PCM layer states, via multilayer Fresnel reflection processes.

Also, the uniform common electrode (8) may be patterned such that while electrically it is driven with a single signal, the electrical effect this has on the PCM layer may be confined to some portion of the sub-pixel regions, or all the active sub-pixel region and not the area between pixels required for addressing lines of the active matrix array. This may be advantageous in allowing independent switching of each sub-pixel region, minimising the effect switching a given sub-pixel from the amorphous to crystalline state or back has on neighbouring sub-pixel regions.

The insulating spacer layer (4) may be air or other transparent solid or non-solid insulating material.

While specific details of the materials, thicknesses of those materials used in each layer, and the number of layers of each type of material within the optical stack (9), and in each sub-pixel region, have been described herein as being particularly advantageous in the optical performance provided, and the constructional simplicity of a single PCM layer, when the device of this invention is so configured, it will be understood that may variations exist which may provide similar optical performance and function (switchable control of the reflection from two or more regions of the device between a more highly coloured and a higher brightness condition), but which remain within the scope of this invention.

Figure 8:
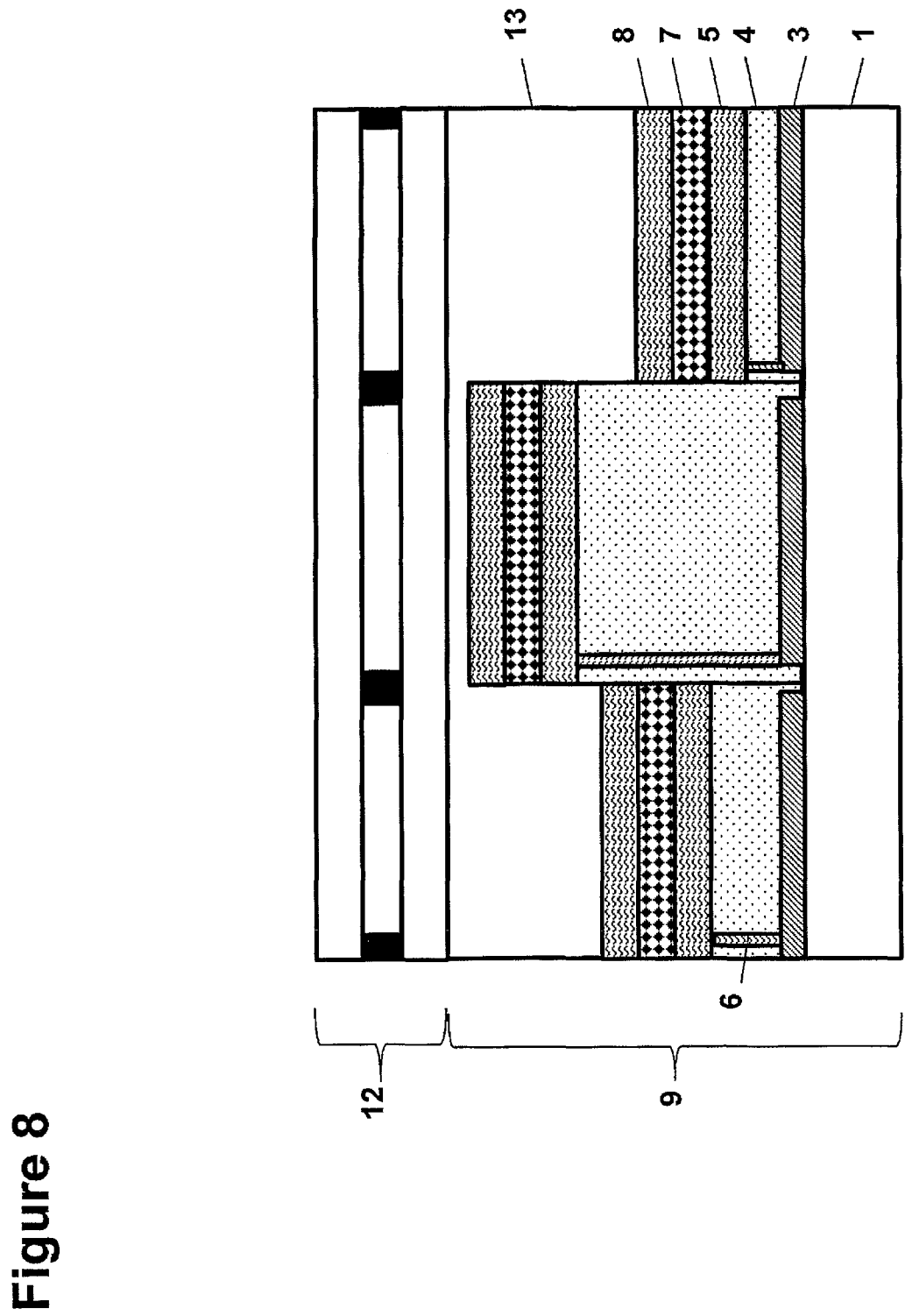
FIG. 8: is a schematic of the optical stack providing a reflective display with a switchable colour filter of an embodiment of this invention.
Figure 9:
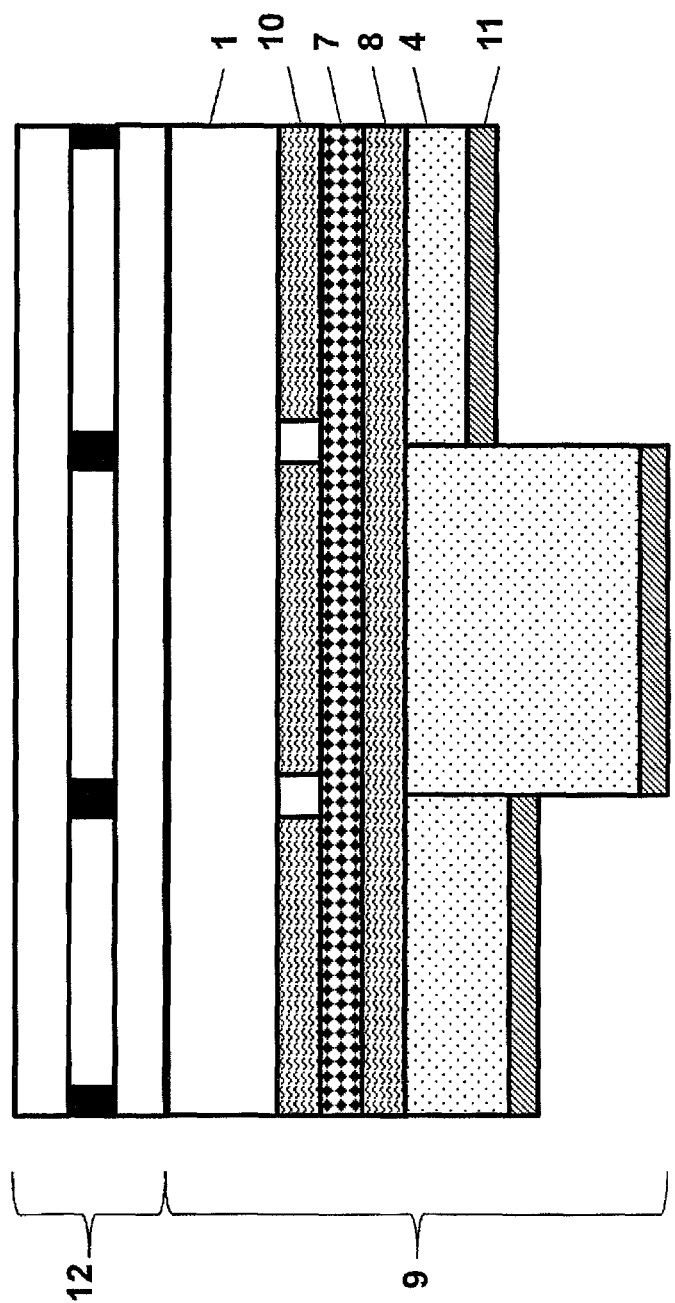
FIG. 9: is a schematic of the optical stack providing a reflective display with a switchable colour filter of an embodiment of this invention.

In a still further exemplary embodiment as depicted in FIG. 8, the switchable reflective colour filter component of the previous embodiments is incorporated into a reflective display device providing full-colour, greyscale image capability. In order to achieve this, the coloured light reflected from each sub-pixel region of the switchable colour filter (9) must be controllably attenuated to allow any relative mixture of the light from the three sub-pixel regions in a pixel to be combined to produce a desired colour and brightness. To provide this capability, the switchable colour filter (9) may be combined with any monochromatic, non-polarisation dependent, spatial light modulator (SLM), or pixelated light valve, for example, a chiral dye guest host liquid crystal device, MEMs, or electrowetting display. FIG. 8 depicts a configuration in which a pixelated switchable absorber or SLM (12) is positioned on the top of a switchable colour filter (9) of the embodiment of FIG. 2. In this case a passivation layer (13) may be used to provide a uniform surface height to bond the two components. The equivalent display arrangement comprising the SLM (12) and switchable colour filter (9) of the type shown in FIG. 6, combined, is shown in FIG. 9. This pixelated switchable absorber may also be active matrix addressed, in which case it may be advantageous to configure this component to have the same pixel array dimensions as the switchable colour filter component, and align the two, minimising the separation of the two components to avoid visible parallax and Moire type artefacts. Conversely, it may be passively, or duty, addressed without the need for a secondary active matrix which may improve overall transmission by maximising the pixel aperture ratio.

In a further embodiment, the switchable colour filter (9) is combined with a pixelated switchable scatterer, for example a polymer networked liquid crystal (PNLC) type display, also known as a "Memory LCD". This type of 2-state scattering display has the advantage of polariser free operation, which maximises brightness, and bistable operation, which allows use of a passive matrix to enable pixelated addressing and zero power requirement to maintain an image (power required for image update only). Conventionally, PNLC type memory displays are only black and white (or matt-white on metallic mirror-like appearance) or use a colour filter to provide 8 colours at much reduced brightness. However, the combination of such a display with the switchable reflective colour filter (9) of this invention would allow a vividly coloured, attractively bright, 64 colour display.

Figure 10:
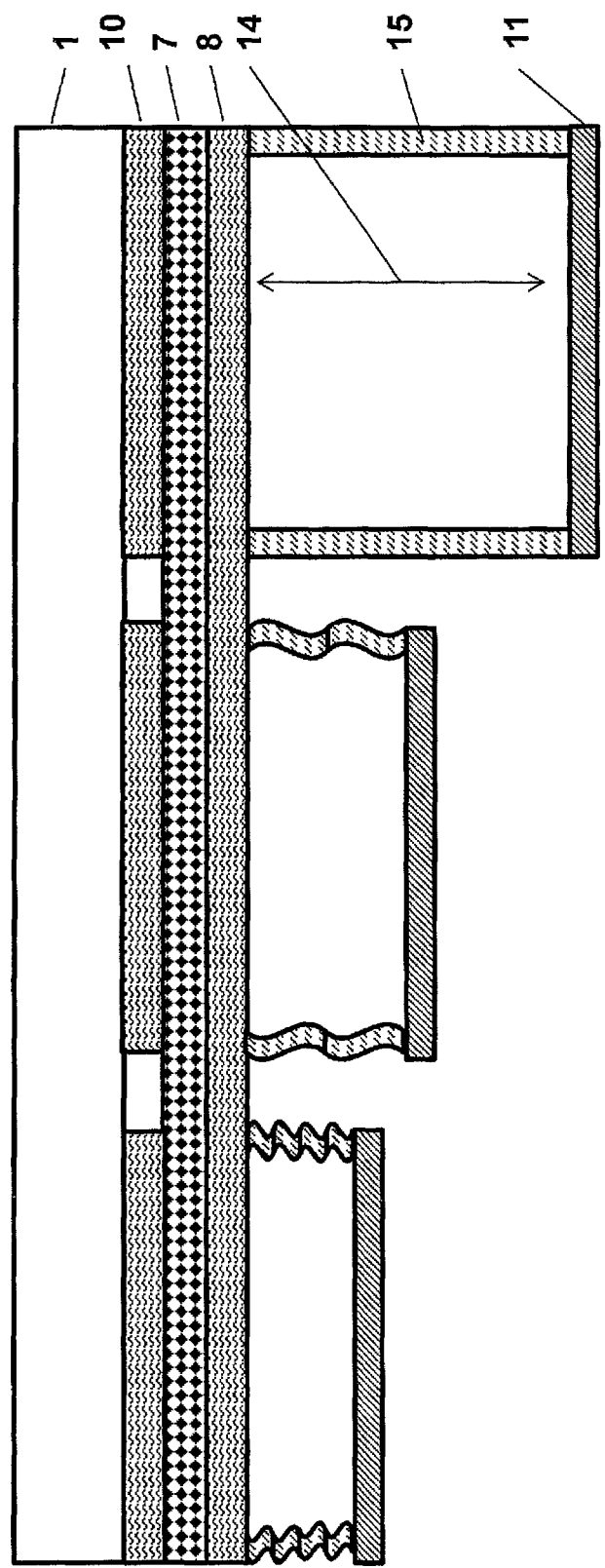
FIG. 10: is a schematic of the optical stack providing a reflective display with a switchable colour filter with an air gap in an embodiment of this invention.

In a still further embodiment of a switchable reflective colour filter as depicted in FIG. 10, the solid insulating spacer layer (4) is replaced by a variable air gap (14). This air gap serves the same function as the solid spacer layer in determining at least in part the colour of light reflected by the optical stack. However, being non-solid state, it may be adjustable in thickness using electrostatic or other actuation, in the manner of known reflective MEMs type displays (SID Symposium Digest of Technical Papers, Volume 42, Issue 1, pages 36-39, June 2011). Advantages of such an arrangement are that the colour gamut and contrast ratio achievable are increased over the known similar MEMs type displays by the extra control afforded by switching of the active PCM layer, and that a single region of fixed ITO and GST layer thickness may be switched to any of a red, green, blue, white and black reflecting state by varying the air gap thickness only. This removes the need to share the reflective area of the device to produce controllable colour, and therefore significantly brighter reflections in the white and coloured states may be achieved, and also no additional switchable absorber (12) is required to control brightness. If the switching speed of the air gap control is sufficiently fast, temporal dither may be applied to switch between coloured and/or white states, and the black state, to control brightness.

Figure 11:
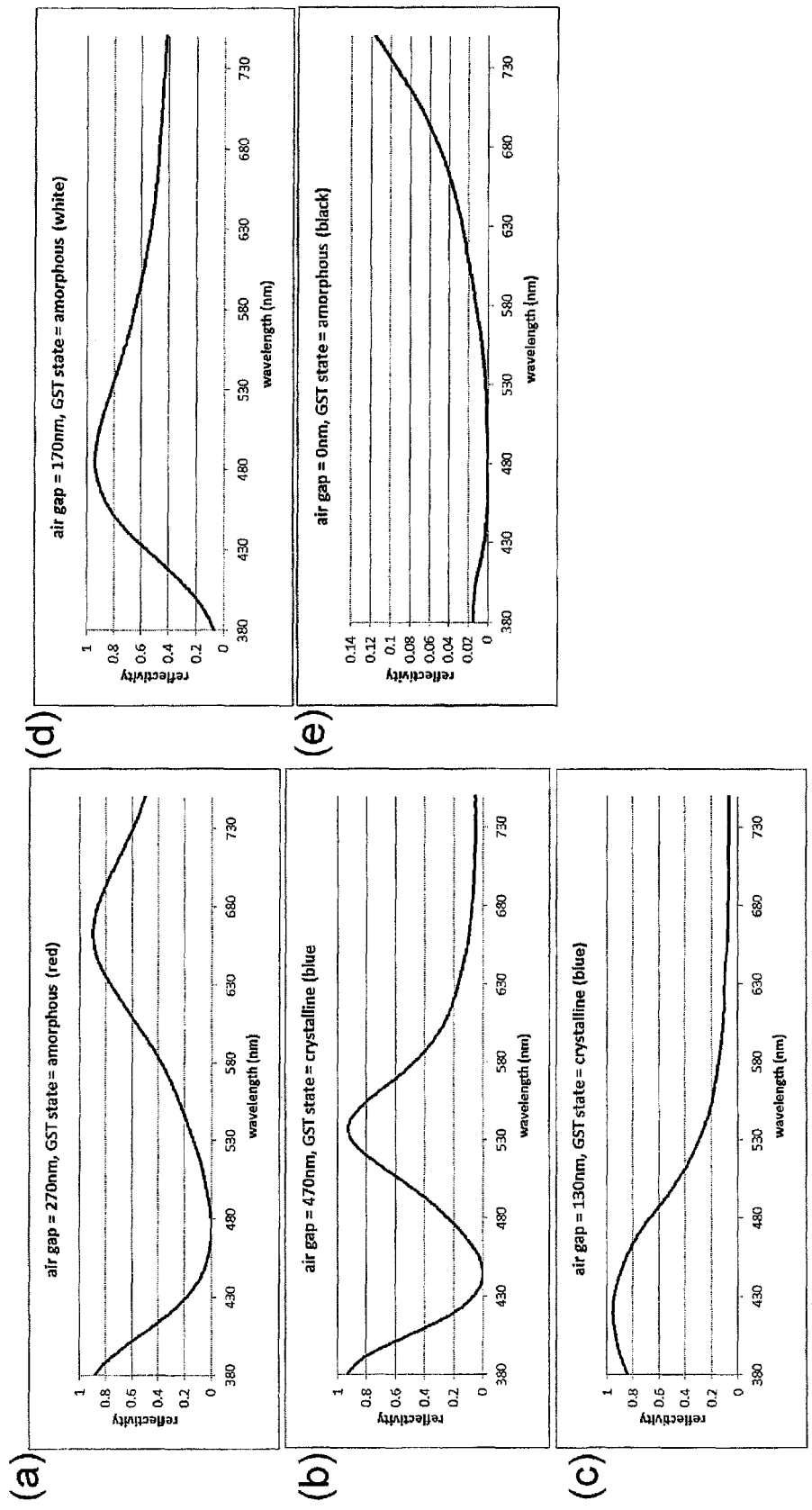
FIG. 11(a)-11(e): are graphs showing the reflection spectra of a single sub-pixel region of a display device, in five different states it may be switched to, defined by the thickness of a variable air gap, and the crystalline state of the PCM layer, in an embodiment of this invention.
Figure 12:
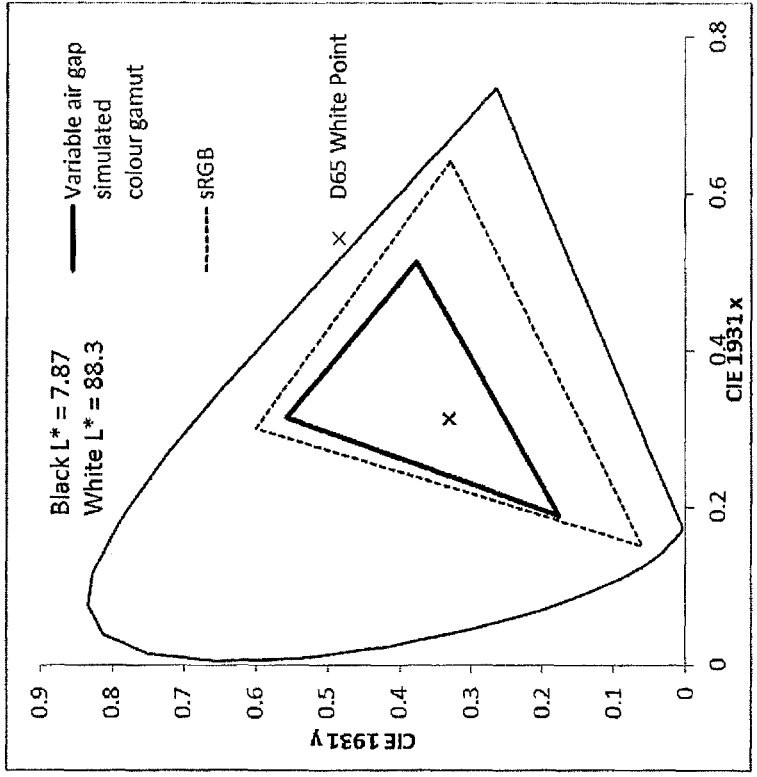
FIG. 12: is a graph showing the resulting gamut areas, and white point of the reflected colour of the states of the display device of an embodiment of this invention, under D65 illumination, in the CIE 1931 colour diagram.

The device configuration of FIG. 10 is shown with the ITO electrodes (10,8) and GST (7) layers deposited on the substrate (1), with the mirror layer (11) attached by flexible supports (15) to allow the air gap (14) thickness between the lower ITO counter electrode (8) and mirror (11) to be varied. As seen in FIG. 10, the thickness of the air gap is separately varied in different regions of the reflective colour filter to form a plurality of sub-pixel regions having different reflective properties. It will be understood however, that this configuration may be altered, for example, with the mirror layer (14) on the substrate (1), and the remainder of the optical stack (layers 10, 7 and 8) suspended by the flexible supports (15), while maintaining the function, and therefore scope, of the invention. Optical simulation indicates that using an upper ITO layer thickness of 10 nm, a lower ITO (8) thickness of 40 nm, and a GST layer thickness of 7 nm for all sub-pixels, then adjusting the air gap layer thicknesses to 270, 470, 130, 170, and 0 (contacted) nm, and the GST layer in the amorphous, crystalline, crystalline, amorphous and amorphous states, provides reflections giving Red, Green, Blue, White and Black appearance respectively. The air gap and CST layer states, and resulting simulated reflection spectra for these states, are illustrated in FIGS. 11(a-e). The resulting colour gamut and lightness levels of the Black and white states are also illustrated in FIG. 12.

As variable control of the air gap thickness with multiple stable states may be difficult to achieve, a modification of this embodiment may only have capability for each sub-pixel to switch between two thicknesses of air gap. In this case, the display device may comprise a plurality of sub-pixel regions, each of which reflects one of a red, green or blue appearance in one configuration of the air-gap thickness and GST state, and black in another configuration of these two binary switchable conditions. In this way, colour is generated by the combination of reflections form multiple sub-pixel areas, as with previous embodiments, but the brightness of each coloured sub-pixel may be controlled by switching to the black state for at least a portion of the display frame time, removing the need for an additional pixelated switchable absorber.

In a still further embodiment, a display comprising the switchable reflective colour filter (9) may used in conjunction with a customised image data processing algorithm which formats input image data of a conventional standard (e.g. sRGB), which assumes a particular colour rendering capability if its destination display, to display most appropriately on the display of this embodiment. In order to do this, the image data processing algorithm may utilise knowledge of the colour and luminance (reflectance) rendering capability of the display in the various pale and vivid reflecting states of the multiple coloured pixel types, to reformat the input image data and separate the data intended for a given pixel in the image out into instructions for the switchable colour filter (9) and the switchable attenuator or scatterer (12) at their corresponding pixel locations. For example, the algorithm may take as inputs the three 8-bit data values specifying luminance in each of the 3 coloured sub-pixels of a pixel in an sRGB display, and convert these data values into co-ordinates in a device independent colour space (e.g. the CIE XYZ colour space). The algorithm could then determine which of the 8 colour reflection states each pixel of the display can produce, via the different combination of pale/vivid state being applied to each to the three sub-pixel regions, provides a colour gamut which encompasses the colour co-ordinate specified by the input data. The algorithm could then output the determined pale/vivid state requirements for each of the sub-pixel regions to the corresponding pixel of the switchable colour filter (9) and the required attenuation or scattering level to the corresponding pixel of the switchable attenuator or scatterer (12), in order to most effectively reproduce the intended colour appearance for that pixel. In the event that the intended colour position of a given pixel is outside the gamut achievable by any of the 8 possible colour states, the state which has the gamut edge closet to the intended colour position may be selected, or optionally a conversion of the input colour data to map it in a perceptually optimised manner to the gamut achievable by the combination of the 8 selectable colour states may be performed.

An example method by which the algorithm may achieve this could be by storing in memory 8 pre-calculated 3×3 conversion matrices, one each for conversion of luminance linearised input RGB data from the source colour space (e.g. sRGB) to the destination space (e.g that achieved by the display) for each of the combinations of pale/vivid states applied to each sub-pixel region. The application of each conversion matrix will then yield positive values between 0 and 1 for each of the luminance levels required from each sub-pixel if the intended colour position of the pixel is within the gamut achievable by the pixel in the selected colour state. If the intended colour position of the pixel is outside this gamut, negative values, or positive values greater than 1 will be returned. If none of the 8 conversion matrices return target sub-pixels luminances between 0 and 1, for all three sub-pixels, then the state corresponding to the matrix with the lowest sum of negative values and portions of values exceeding unity may be selected.

In this way, the combination of the image data processing algorithm and the display enables the display to most closely represent the intended appearance of the input image data, adaptively selective the reflective colour state of each pixel on a pixel-by-pixel basis, to effectively provide an adaptive colour gamut display. The algorithm may be implemented in the display driver or control electronics, or in software or in the graphics processing unit of the device hosting the display.

An aspect of the invention, therefore, is a switchable reflective colour filter for use in a display device. In exemplary embodiments, the switchable reflective colour filter includes a plurality of sub-pixel regions including sub-pixel regions of at least two colour types, each comprising a layer of phase change material which is switchable between a first state and a second state, the first and second states being two solid but structurally distinct states having different optical properties. Each sub-pixel region further includes two electrode layers, a mirror layer, and a spacer layer. The phase change material layer in each sub-pixel region is positioned between the two electrode layers, and separated from the mirror layer by the spacer layer.

In an exemplary embodiment of the switchable reflective colour filter, the phase change material of a given sub-pixel region is switched between the first state and the second state to change the spectrum of reflected light from the given sub-pixel region from a narrower band, more vividly coloured characteristic, to a broader band, more pale coloured but brighter characteristic of the first state relative to the second state.

In an exemplary embodiment of the switchable reflective colour filter, the plurality of sub-pixel regions comprises sub-pixel regions of three colour types, being red, green and blue reflecting, thereby in combination reflecting light of a white appearance, the colour type of each sub-pixel region being determined by a thickness of at least one of the electrode, mirror, and spacer layers.

In an exemplary embodiment of the switchable reflective colour filter, the colour type of each sub-pixel region is determined by the thickness of the spacer layer only, the electrode and mirror layers being uniform in all sub-pixel regions.

In an exemplary embodiment of the switchable reflective colour filter, the phase change material is electrically switchable.

In an exemplary embodiment of the switchable reflective colour filter, the phase change material is thermally switchable.

In an exemplary embodiment of the switchable reflective colour filter, the spacer layer is a passive, optically transparent, and electrically insulating spacer layer.

In an exemplary embodiment of the switchable reflective colour filter, each sub-pixel region further includes a channel of conducting material that extends through the spacer layer and electrically connects the mirror layer and a first one of the two electrode layers.

In an exemplary embodiment of the switchable reflective colour filter, a second one of the two electrode layers is a transparent counter electrode.

Another aspect of the invention is reflective display device. In exemplary embodiments, the reflective display device includes the switchable reflective colour filter of any of the above embodiments, and a pixelated switchable absorber. A luminance of coloured light reflected from any of the sub-pixel regions is controllably attenuated by the pixelated switchable absorber.

In an exemplary embodiment of the reflective display device, the display device further includes a passivation layer that provides a uniform surface height of the switchable reflective colour filter bonded to the switchable absorber.

Another aspect of the invention is an alternative reflective display device. In an exemplary embodiment, the display device includes two electrode layers and a layer of phase change material between the two electrode layers, the phase change material being switchable between at least a first state and a second state, the first and second states being two solid but structurally distinct states having different optical properties. The display device further includes a mirror layer, and an air gap of variable thickness between the mirror layer and one of the electrode layers. A thickness of the air gap is separately varied in different regions of the reflective display device to form a plurality of sub-pixel regions having different reflective properties.

In an exemplary embodiment of the reflective display device, the at least first and second states of the phase change material include at least two colour states.

In an exemplary embodiment of the reflective display device, the at least first and second states of the phase change material include both a bright and a dark achromatic state.

In an exemplary embodiment of the reflective display device, the air gap thickness is controllable via electrostatic actuation of the mirror layer.

In an exemplary embodiment of the reflective display device, the mirror layer is suspended from the one of the electrode layers via flexible supporting structures.

In an exemplary embodiment of the reflective display device, the air gap is controllable only between two thickness states.

In an exemplary embodiment of the reflective display device, a first one of the two thickness states is a zero air gap state, and a second one of the two thickness states is a fixed non-zero thickness gap.

In an exemplary embodiment of the reflective display device, the electrode layers and the phase change material layer have a fixed thickness across the plurality of sub-pixel regions.

In an exemplary embodiment of the reflective display device, the plurality of sub-pixel regions comprises sub-pixel regions of three colour types, being red, green and blue reflecting, thereby in combination reflecting light of a white appearance, the colour type of each sub-pixel region being determined by the thickness of at least the air gap.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The embodiments of this invention are applicable to many display devices, and a user may benefit from the capability of the display to produce both high brightness and highly coloured region simultaneously. Examples of such devices include mobile phones, Personal Digital Assistants (PDAs), tablet and laptop computers, desktop monitors, Automatic Teller Machines (ATMs), automotive displays and Electronic Point of Sale (EPOS) equipment.

REFERENCE SIGNS LIST

1. Substrate
2. Active matrix array
3. Mirror sub-pixel electrode
4. Insulating spacer layer
5. Transparent sub-pixel lower electrode
6. Channel conducting material
7. Phase change material layer
8. Transparent counter electrode
9. Switchable colour filter
10. Transparent sub-pixel upper electrode
11. Mirror layer with no electrode function
12. Pixelated switchable absorber
13. Passivation layer
14. Variable air gap
15. Flexible support

The invention claimed is:

1. A display device comprising a switchable reflective colour filter and a second active layer;
    the switchable reflective colour filter comprising:
        a plurality of sub-pixel regions including sub-pixel regions of at least two colour types, each comprising a layer of phase change material which is switchable between a first state and a second state, the first and second states being two solid but structurally distinct states having different optical properties;
        each sub-pixel region further including two electrode layers, a mirror layer, and a spacer layer;
        wherein the phase change material layer in each sub-pixel region is positioned between the two electrode layers, and separated from the mirror layer by the spacer layer; and
    wherein the second active layer is configured to function as a light valve.

2. The display device of claim 1, wherein the phase change material of a given sub-pixel region is switched between the first state and the second state to change the spectrum of reflected light from the given sub-pixel region from a narrower band, more vividly coloured characteristic, to a broader band, more pale coloured but brighter characteristic of the first state relative to the second state.

3. The display device of claim 2, wherein the plurality of sub-pixel regions comprises sub-pixel regions of three colour types, being red, green and blue reflecting, thereby in combination reflecting light of a white appearance, the colour type of each sub-pixel region being determined by a thickness of at least one of the electrode, mirror, and spacer layers.

4. The display device of claim 3, wherein the colour type of each sub-pixel region is determined by the thickness of the spacer layer only, the electrode and mirror layers being uniform in all sub-pixel regions.

5. The display device of claim 1, wherein the phase change material is electrically switchable.

6. The display device of claim 1, wherein the phase change material is thermally switchable.

7. The display device of claim 1, wherein the spacer layer is a passive, optically transparent, and electrically insulating spacer layer.

8. The display device of claim 1, wherein each sub-pixel region further includes a channel of conducting material that extends through the spacer layer and electrically connects the mirror layer and a first one of the two electrode layers.

9. The display device of claim 1, wherein a second one of the two electrode layers is a transparent counter electrode.

10. The display device of claim 1
   wherein the second active layer comprises a pixelated switchable absorber; and
   wherein a luminance of coloured light reflected from any of the sub-pixel regions is controllably attenuated by the pixelated switchable absorber.

11. The display device of claim 10, further comprising a passivation layer that provides a uniform surface height of the switchable reflective colour filter bonded to the switchable absorber.

* * * * *